United States Patent [19]
Wittenstein et al.

[11] Patent Number: 5,507,093
[45] Date of Patent: Apr. 16, 1996

[54] FORGED-STEEL CONNECTING ROD

[75] Inventors: Horst Wittenstein, Plettenberg; Hendrik Muntinga, Herscheid, both of Germany

[73] Assignee: Hammerwerk Schulte GmbH & Co. KG, Plettenberg, Germany

[21] Appl. No.: 222,288

[22] Filed: Apr. 4, 1994

[30] Foreign Application Priority Data

Apr. 5, 1993 [DE] Germany ............................ 43 11 108.4
Jul. 8, 1993 [DE] Germany ............................ 43 22 832.1

[51] Int. Cl.$^6$ .................................................. B23D 17/00
[52] U.S. Cl. ...................... 29/888.09; 29/413; 29/414; 29/415; 29/416; 72/377; 72/356; 225/2; 225/103
[58] Field of Search ........................ 29/888.09, 413, 29/414, 415, 416, 417; 225/2, 104, 103; 72/356, 377

[56] References Cited

U.S. PATENT DOCUMENTS

| | | | |
|---|---|---|---|
| 2,553,935 | 5/1951 | Parks et al. | 29/156.5 |
| 3,730,020 | 5/1973 | Di Matteo, Sr. et al. | 74/579 E |
| 3,751,080 | 8/1973 | Bailey et al. | 287/52.03 |
| 3,818,577 | 6/1974 | Bailey et al. . | |
| 4,569,109 | 2/1986 | Fetouh | 29/156.5 A |
| 4,662,047 | 5/1987 | Berchem | 29/156.5 R |
| 4,684,267 | 8/1987 | Fetouh | 384/294 |
| 4,693,139 | 9/1987 | Mukai et al. . | |
| 4,733,586 | 3/1988 | Manusch et al. | 29/415 |
| 4,754,906 | 7/1988 | Brovold . | |
| 4,860,419 | 8/1989 | Hekman | 29/156.5 |
| 4,884,900 | 12/1990 | Pirault et al. . | |
| 4,923,674 | 5/1990 | Weber . | |
| 4,993,134 | 2/1991 | Hoag et al. | 29/888.092 |
| 5,109,605 | 5/1992 | Haag et al. | 29/888.09 |
| 5,208,979 | 5/1993 | Schmidt | 29/888.09 |

FOREIGN PATENT DOCUMENTS

| | | |
|---|---|---|
| 0167320 | 7/1984 | European Pat. Off. . |
| 0330830 | 9/1989 | European Pat. Off. . |
| 0342800 | 11/1989 | European Pat. Off. . |
| 0507519 | 7/1992 | European Pat. Off. . |
| 9305170 | 8/1993 | United Kingdom . |
| 9317323 | 2/1994 | United Kingdom . |

Primary Examiner—Irene Cuda
Assistant Examiner—Mark W. Butler
Attorney, Agent, or Firm—Herbert Dubno

[57] ABSTRACT

A forged-steel connecting rod blank is formed with intentional-break zones extending over one or both of the broad crankshaft-eye surfaces of the connecting rod or as crevices formed radially in the inner surface of the large-diameter bore of the eye and running from an upper edge to a web of the material which is ultimately punched out.

8 Claims, 3 Drawing Sheets

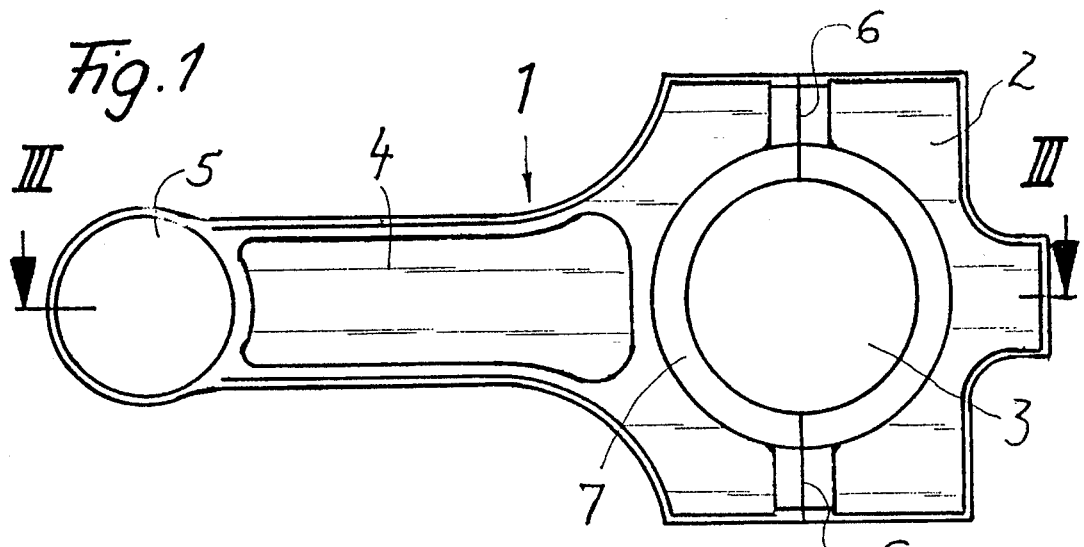
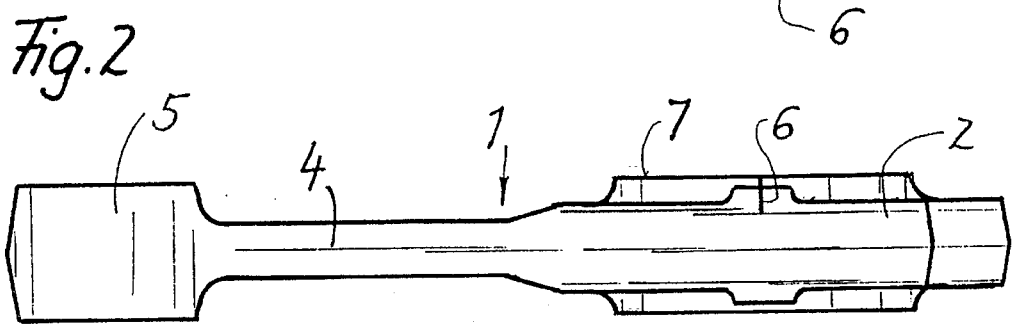
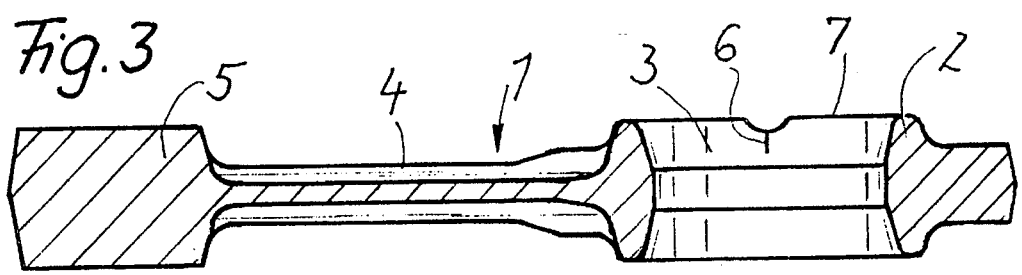
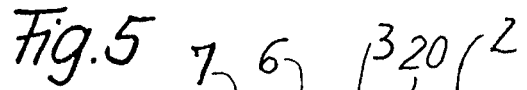
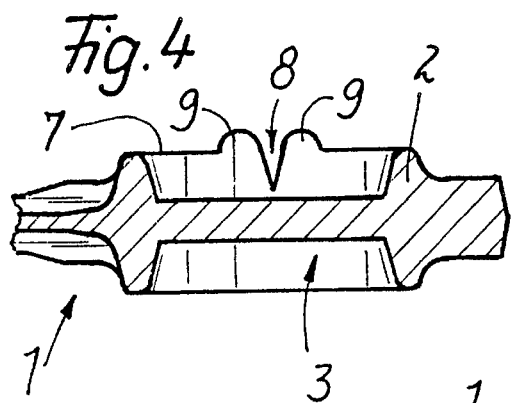
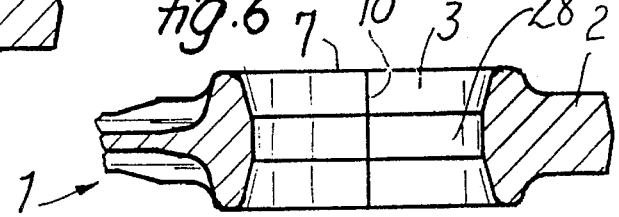

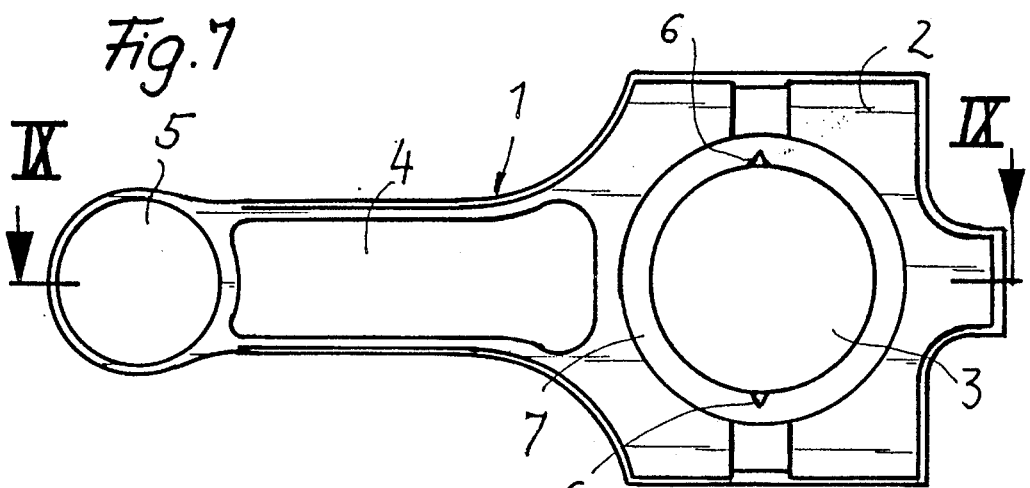
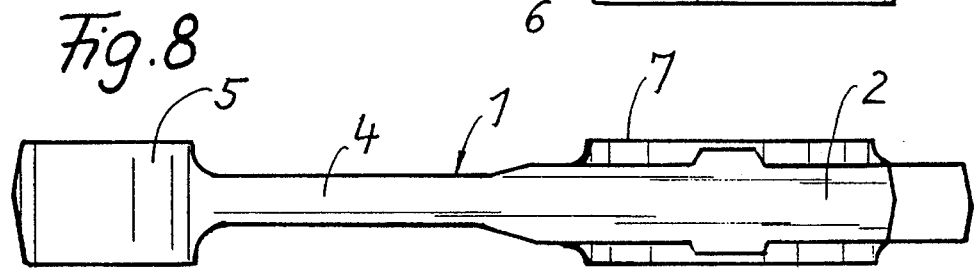
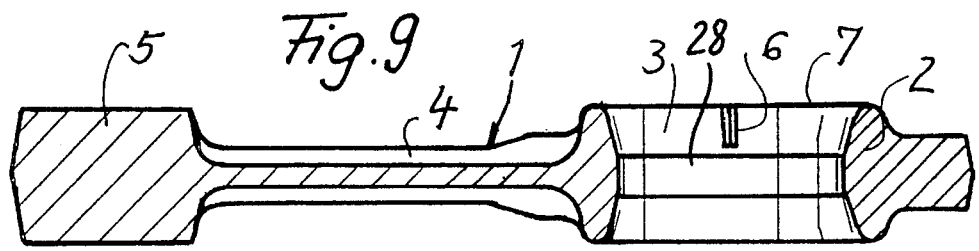
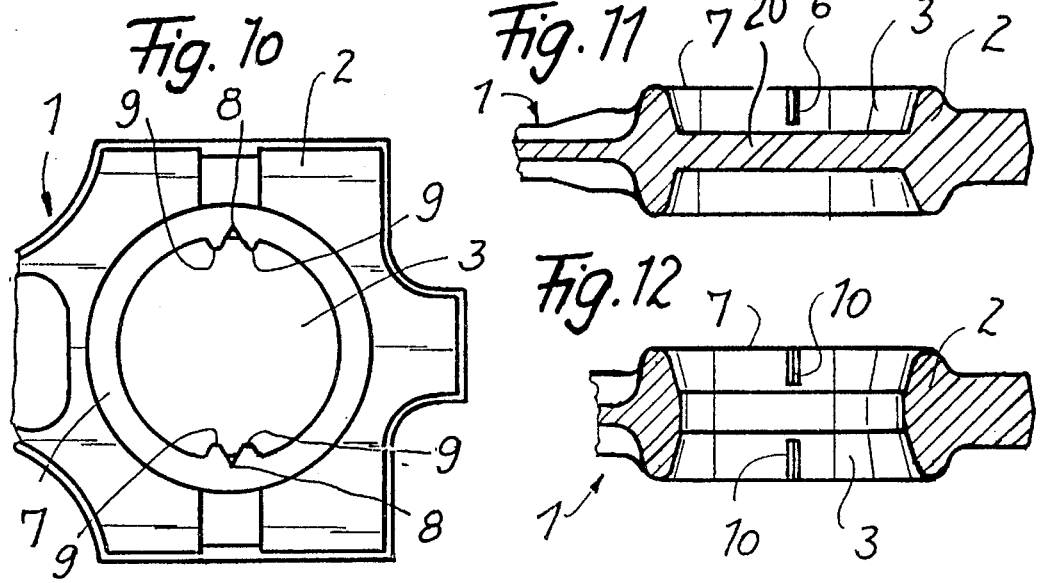
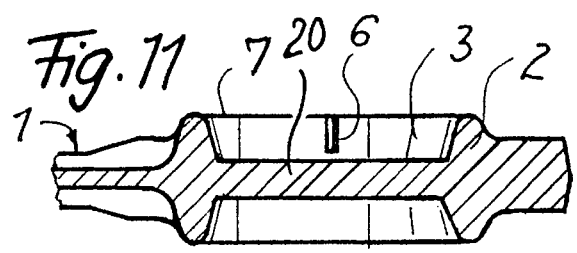
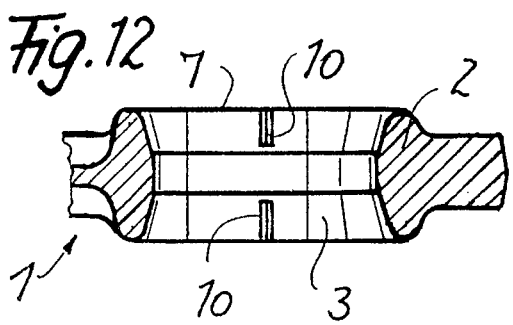

FORGED-STEEL CONNECTING ROD

FIELD OF THE INVENTION

The present invention relates to a forged-steel connecting rod and, more particularly, to a connecting rod formed by breaking a connecting rod blank at a crankshaft eye thereof to form the rod and the bearing cap which can clamp the crankshaft bearing in the crankshaft end of the rod. More particularly the invention relates to a forged-steel connecting rod blank having a crankshaft eye with a large-diameter bore at one end to receive the crankshaft, and a piston-pin eye at the other end of the shank, whereby an intentional-break location is provided centrally of the crankshaft eye bore at which the blank can be broken into the bearing cap and the connecting rod.

BACKGROUND OF THE INVENTION

Forged-steel connecting rod blanks of the aforedescribed type can be formed in a forging die in two stages. The resulting blank is then subjected to complete mechanical machining. The most important machining step includes separation of the bearing cap from the connecting rod, followed by a machining of the separate surfaces and the subsequent provision of a bearing in the split hole or bore of the crankshaft eye which can be clamped between the bearing cap and the rod and which rotatably receives the crankshaft. The separating surface lies at the center of the crankshaft bore. In further processing steps bores are provided for the screws or bolts which draw the bearing cap against the rod, including threading where necessary, and the machining of the piston-pin bore and the crankshaft bore to the desired diameter and finish.

Such forged connecting rods must be capable of being manufactured at low cost and should be able to be carried out such that separate machining steps for the surfaces between the bearing cap and the rod are unnecessary or can be eliminated.

In EP 0 507 519 A2 a steel-forged connecting rod is described which has a crack initiating crevice which facilitates separation of the cap from the connecting rod at the crankshaft bearing eye by a breaking or cracking operation, the breakage plane lying midway of the large-diameter bore transverse to the longitudinal dimension of the rod. The break-initiating crevice or gap is a crevice which can extend parallel to the axis of the large-diameter bore and can be located along the inner wall of the crankshaft eye or the exterior of the eye. The result is the ability to crack the crankshaft bearing eye more or less cleanly. Special operating steps are, however, required to form the crevice or notch.

Another process is described in EP 0 330 830 A1 for producing connecting rods in the form of powder-forged components. It has been found, however, that here too the breakage crevice or notch must be produced in a separate working step. The intended break cracks here also extend parallel to the axis of the large-diameter bore of the connecting rod.

OBJECTS OF THE INVENTION

It is the principal object of the present invention to provide an improved method of making a connecting rod whereby drawbacks of earlier fabrication techniques are avoided.

SUMMARY OF THE INVENTION

These objects and others which will become apparent hereinafter are attained in accordance with the invention in the shaping of a steel connecting rod blank by forging such that the desired-break location is formed as a crack in the connecting rod blank provided on at least one of the two broad sides of the crankshaft eye and extending radially to the large diameter of the crankshaft eye.

With this arrangement and configuration of the intentional-break location on the broad side of the crankshaft eye, i.e. not parallel to the axis of the large-diameter bore but extending radially outwardly therefrom, it is possible to generate this unintentional-break location without additional steps since it can be formed exclusively by a corresponding configuration of the forging die. The shape of the forging die does not have to be materially changed and thus its cost is not significantly increased while the number of steps required to produce the connecting rod can be reduced.

The forged-steel connecting rod blank of the invention thus comprises a one-piece elongated steel body formed at one end with a crankshaft eye formed with a large-diameter bore adapted to receive a portion of a crankshaft, a shank extending longitudinally from the bore, and a piston-pin eye at an end of the shank constituting an opposite end of the body, the piston-pin eye being formed with a small-diameter bore adapted to receive a piston pin and of a diameter less than a diameter of the large-diameter bore, the body being substantially flat and having opposite sides generally in planes perpendicular to axes of the bores, the body being formed at the crankshaft eye with at least one crevice extending inwardly from at least one of the sides and elongated radially of the large-diameter bore as a preset intended break location ensuring breakage of the crankshaft eye along a line extending the crevice into a connecting rod and a bearing cap connectable with the connecting rod.

Preferably the crevice or the formation which can be closed to form the crevice, can be provided on only one of the broad faces of the connecting rod blank to thereby ensure that there will be no overlap in cracks in starting from two crevices. When the crevices are perfectly aligned, they can be provided in both of the broad surfaces. To simplify the subsequent breakage operation and provide a well-defined break zone, it is advantageous to provide the crevice over the entire width of the material of the crankshaft eye surrounding the large-diameter bore. The depth of the crevice should be at least 0.5 mm, preferably more than 0.5 mm and less than 1.0 mm. A most preferred crevice depth is 0.65 mm. With this configuration of the crevice, a grinding of the broad surfaces of the connecting rod or the blank can be carried out before cracking takes place during the finishing machining.

It has been found to be advantageous to provide the crevice so that the material fibers of the blank which extend in the longitudinal direction of the connecting rod remains substantially uninterrupted in the region of the crack and substantially follow the crack. This facilitates clean breakage during the cracking process.

Alternatively, the intentional-break location can be formed by providing a crack which is located at least along one side of the crankshaft eye in the wall surrounding the large-diameter bore and extending axially from the axially-disposed outermost edge of the bore until approximately a central region of the bore which is formed with a web across the bore adapted to be stamped out in a subsequent stamping or punching process. In this case, the forged-steel connecting rod blank can comprise a one-piece elongated steel body formed at one end with a crankshaft eye formed with a large-diameter bore adapted to receive a portion of a crankshaft, a shank extending longitudinally from the bore, and a piston-pin eye at an end of the shank constituting an opposite end of the body, the piston-pin eye being formed with a small-diameter bore adapted to receive a piston pin and of a diameter less than a diameter of the large-diameter bore, the body being substantially flat and having opposite sides generally in planes perpendicular to axes of the bores, the body being formed at the crankshaft eye with an annular wall surrounding the large-diameter bore, at least one crevice formed in the wall and extending axially from an outer edge thereof to substantially a central region of the large diameter bore to form a preset intended break location ensuring breakage of the crankshaft eye along a line extending the crevice into a connecting rod and a bearing cap connectable with the connecting rod, the central region being formed by a web of the body adapted to be punched from the body.

While the formation of a crack-forming notch radially along an inner surface of the bore is preferred, that notch can lie on a radially outer side of the bore in a wall portion extending from the broad surface of the blank. This notch can also be provided by pressing material out of the blank and utilizing a die which is not made materially more complex by the edge which forms the notch.

The intentional-break location can thus extend from the mouth of the hole at which the crevice begins over a substantial portion of the depth of the hole along the inner wall and up to the central region from which that web can be punched out. Preferably such crevices in this embodiment are provided from both outer edges of the large-diameter bore axially inwardly and are axially aligned and another pair of such crevices can be provided at a diametrically opposite location of the bore.

In this case, a total of four crack-initiating locations are preferably provided on the inner surface of the large-diameter bore in the crankshaft eye so that cracking of the bearing cap from the connecting rod can be effected in a well-defined manner.

It is also possible to provide diametrically opposite crevices on only one side of the bore when there is a danger, for example, that the cracks may overlap.

Preferably in the fabrication of the blank corner of the invention, a notch is formed where the crevice is to be provided in a first forging step, banks of the material displaced from the notch in the die being pressed back when the notch is closed to form the crevice in a second forging step. The notch can have a V shape with ridges or bulges of the material adjacent the notch forming the material which is pressed back in the second step.

The method of forging the connecting rod blank can thus comprise the steps of:

(a) forging a one-piece elongated steel body formed at one end with a crankshaft eye formed with a large-diameter bore adapted to receive a portion of a crankshaft, a shank extending longitudinally from the bore, and a piston-pin eye at an end of the shank constituting an opposite end of the body, the piston-pin eye being formed with a small-diameter bore adapted to receive a piston pin and of a diameter less than a diameter of the large-diameter bore, the body being substantially flat and having opposite sides generally in planes perpendicular to axes of the bores, with at least one notch adapted to form a crevice, and mounds of material of the body displaced from the notch and disposed on opposite sides of flanks of the notch; and (b) die forging the body formed in step (a) to a finished blank while forcing the material back into the notch, thereby closing the notch to a crevice at a preset intended break location ensuring breakage of the crankshaft eye along a line extending the crevice into a connecting rod and a bearing cap connectable with the connecting rod.

The notches can have a depth corresponding to the depth of the crevices ultimately formed as described above. When the opposite faces of the blank are ground, the grinding should be effected to a depth less than that of the crevices produced in the die-forging process.

The body of the blank to be formed will normally be provided with the bores before the forging and any punching step is carried out, whereupon die forging and breakage of the crankshaft eye is effected.

The method can then further comprise the steps of:

(c) breaking the crankshaft eye at the crevice and along the line;

(d) assembling the rod and the cap along the line by tightening screws connecting the rod and the cap; and (e) machining the rod and cap as assembled in step (d).

BRIEF DESCRIPTION OF THE DRAWING

The above and other objects, features, and advantages will become more readily apparent from the following description, reference being made to the accompanying drawing in which:

FIG. 1 is a plan view of a forged-steel connecting rod blank according to the invention prior to breaking of the bearing cap from the connecting rod;

FIG. 2 is a side elevational view of this connecting rod blank;

FIG. 3 is a cross sectional view taken along the line III—III of FIG. 1;

FIG. 4 is the partial section of the crankshaft eye of this connecting rod showing a step in an alternative mode of fabrication from that of FIG. 3;

FIG. 5 is a section corresponding to FIG. 4 illustrating the result of a second forging step carried out on the blank of FIG. 4;

FIG. 6 is another section through the crankshaft eye of a blank showing the crack propagating through the eye after the web has been punched out;

FIG. 7 is a view similar to FIG. 1 illustrating another embodiment;

FIG. 8 is a side elevational view of the blank of FIG. 7;

FIG. 9 is a cross sectional view along the line IX—IX of FIG. 7;

FIG. 10 is a plan view of the crankshaft end of a blank after a first forging step and prior to a second forging step;

FIG. 11 is a cross sectional view through the crankshaft eye of a blank illustrating the relationship of the crack-inducing notch or grooves to the web to be punched therefrom;

FIG. 12 is a view similar to FIG. 11 of another embodiment;

SPECIFIC DESCRIPTION

Figure 13:
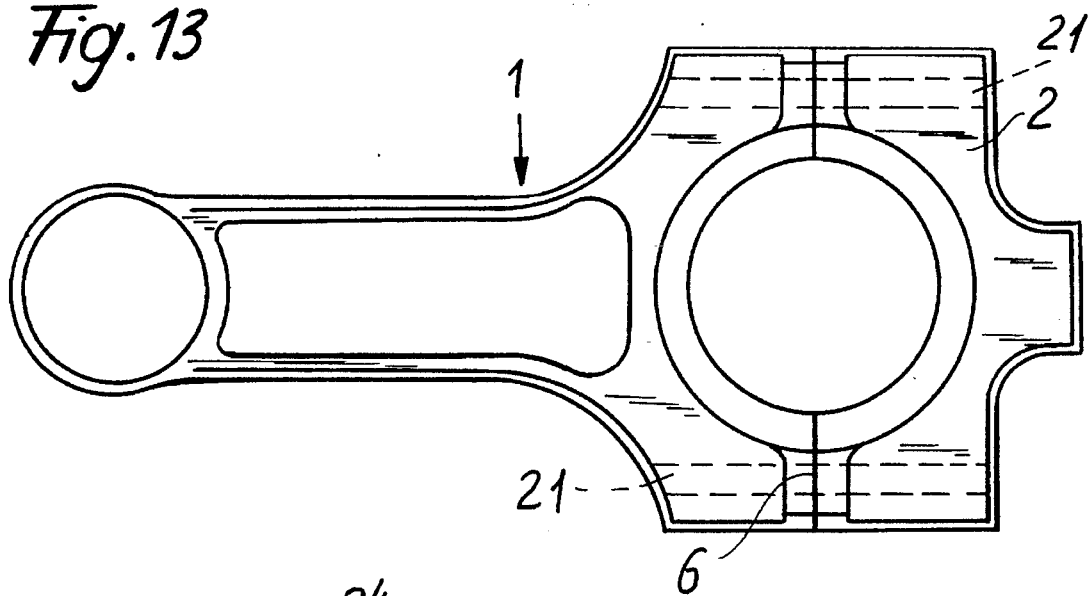
FIG. 13 shows the step following die forging on a blank in accordance with the embodiment of FIG. 1.

The forged-steel blank 1 shown in FIG. 1 is adapted to form a connecting rod and comprises a crankshaft eye 2 with a large-diameter bore 3 adapted to receive a crankshaft bearing and, of course, the crankshaft which rotates within that bearing and causes the connecting rod to reciprocate or transforms the reciprocation of the connecting rod to rotation of the crankshaft.

A shank 4 extends from the crankshaft eye 2 and is formed at its opposite end with a piston-pin eye 5 rotatably receiving the piston pin. Transverse to the longitudinal extension of the shank 4 and midway of the bore 3, the crankshaft eye 2 is formed with an intentional break region at which the connecting rod 1 can be broken into a piston rod 2' and a bearing cap 2". The intentional-break location is formed with a crevice 6 during the forging operation, extending radially of the large-diameter bore 3 and preferably over the full width of the crankshaft eye 2 on at least one of the broad sides of the latter. The depth of the crevice 6 is preferably 0.65 mm and the surface in which the crevice 6 is provided is set below the plane of the outer edge 7 of the crankshaft eye 2.

To fabricate the forged-steel connecting rod blank 1, the steel body after the formation of the bores 3 and 5' is die-forged in a first step in which in the region of the crevice 6, a V-shaped notch 8 is provided (FIG. 4) with banks of material 9 as displaced from this notch disposed in mounds either side thereof. The forging die has, for this step, a complementary configuration.

In the second forging step, the blank is again inserted into a die and by closing of the die, the notch 8 is closed and the raised mounds of material 9 are displaced back into the notch. The closure of the notch is represented in FIGS. 3 and 5 where the notch is transformed into a crevice. The notch can have a depth also of about 0.65 mm.

The notch 8 can be provided on only one side of the crankshaft eye 2 (yielding the crevices 6 shown in FIG. 2, 3 and 5), if one must be certain that overlapping cracks will not occur in the breaking of the blank to separate the bearing cap 2 from the piston rod 2'.

During finish grinding of the connecting rod, the grinding depth should be less than the depth of the crevice 6.

A web 20 may be punched out of the central region of the large-diameter bore.

Figure 14:
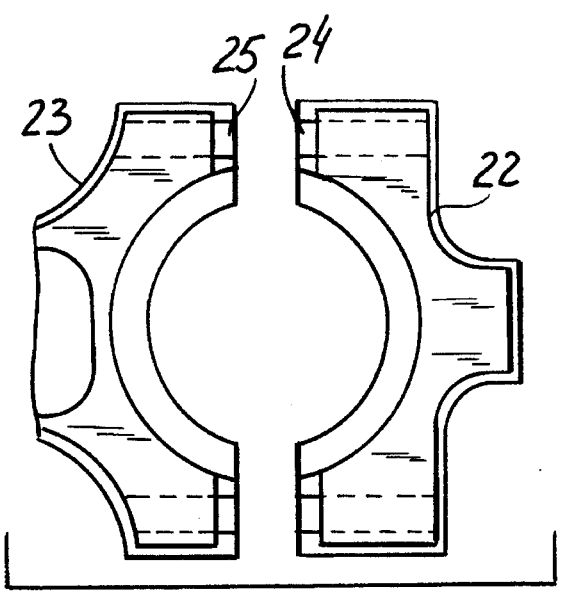
FIG. 14 shows the crankshaft eye following breakage to separate the bearing cap from the connecting rod.
Figure 15:
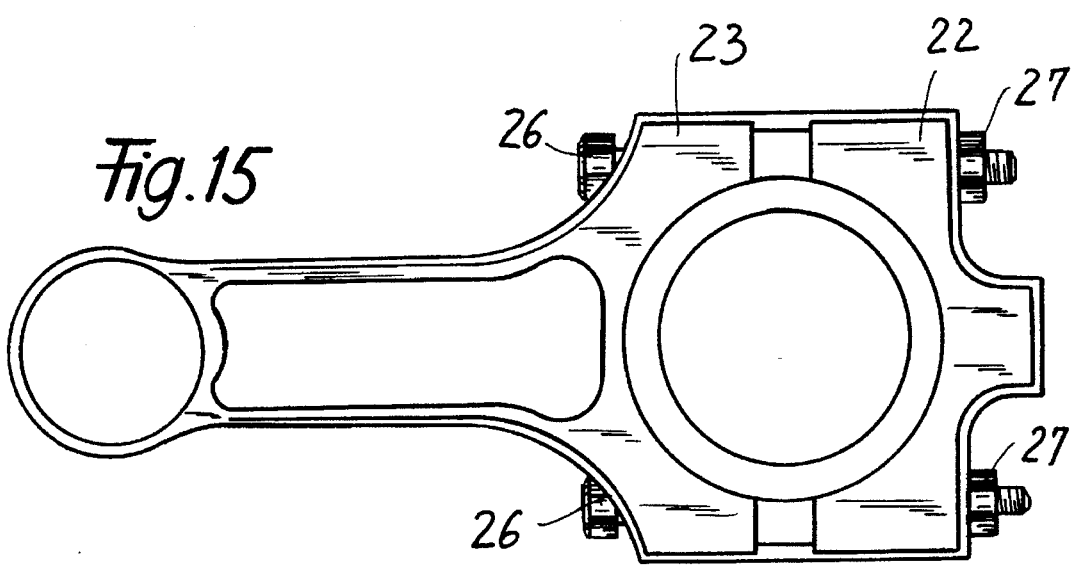
FIG. 15 is a plan view of the connecting rod and cap held together by bolts for the final machining operation.

As can be seen from FIG. 13, prior to the cracking of the blank 1, the crankshaft eye 2 is provided with bores 21 which ultimately will be used to receive bolts or screws for clamping the two parts of the piston-rod assembly around the crankshaft bearing. In a subsequent step (FIG. 14), the bearing cap 22 is broken along the crevice 6 from the piston rod 23 to form operating surfaces 24 and 25 which do not need machining normally.

The bearing cap 22 can then be joined to the piston rod 23 by the screws 26 and the nuts 27 to form an assembly which can be ground or machined in the finishing operations.

The bores 21 may be threaded in part if the nuts 27 are to be eliminated.

With the cracking operation of the present invention, a number of operating steps hitherto required for the fabrication of connecting rods can be avoided.

In FIG. 6, crevices are provided at 10 on opposite sides of the crankshaft eye 2 terminating short of a central region 28 of the eye and radially propagating into one another when the cracking force is applied.

As can be seen from FIGS. 7 and 8, the connecting rod blank 1 can alternatively be provided with notches or crevices 6 at diametrically opposite inner walls of the large-diameter bore 3 from the upper edge 7 to a point corresponding to the central region 28 which may contain the web 20 to be punched out. Before cracking, the web 20 (FIG. 11) is punched out of the bore 30. The notches or crevices 10 can be provided from opposite sides (FIG. 12).

As can be seen from FIG. 10, the crevices 6 may initially be formed as V-shaped notches forming the mounds 9 of material displaced from these notches and driven radially into the wall of the bore 3. In a second forging operation, the mounds 9 are driven back into the notch to form cylindrical crevices 6 at which the cap is broken away from the connecting rod in the manner described. Here too upon grinding of the blank, the grinding thickness should be less than the depth crevice so that the crevice remains until the cap is broken off.

We claim:

1. A method of forging a steel connecting rod blank comprising the steps of:
    (a) forging a one-piece elongated steel body formed at one end with a crankshaft eye formed with a large-diameter bore adapted to receive a portion of a crankshaft, a shank extending longitudinally from said bore, and a piston-pin eye at an end of said shank constituting an opposite end of said body, said piston-pin eye being formed with a small-diameter bore adapted to receive a piston pin and of a diameter less than a diameter of said large-diameter bore, said body being substantially flat and having opposite sides generally in planes perpendicular to axes of said small and large diameter bores, with at least one notch adapted to form a crevice, and mounds of material of said body displaced from said notch and disposed on opposite sides of flanks of the notch; and
    (b) die forging the body formed in step (a) to a finished blank while forcing said material back into said notch, thereby closing said notch to the crevice at a preset intended break location ensuring breakage of said crankshaft eye along a line extending said crevice into a piston rod and a bearing cap connectable with said piston rod.

2. The method defined in claim 1 wherein said notch extends radially over an entire width of material of the body outwardly from said large-diameter bore along at least one of said sides.

3. The method defined in claim 1, further comprising the steps of:
    (c) forming connecting holes transverse to said lines in said crankshaft eye for receiving tightening screws,
    (d) breaking said crankshaft eye at said crevice and along said line;
    (e) connecting the piston rod and the cap by inserting said tightening screws into said holes, thereby assembling the piston rod and the cap along said line; and
    (f) machining the piston rod and cap as assembled in step (e).

4. The method defined in claim 1 wherein said body is formed at said crankshaft eye with an annular wall surrounding said large-diameter bore, said crevice is formed in said annular wall and extends axially from an outer edge thereof to substantially a central region of said large-diameter bore, said central region being formed by a web of said body adapted to be punched from said body, and punching said web from said body.

5. The method defined in claim 1 wherein said notch has a depth of at least 0.5 mm and less than 1 mm.

6. The method defined in claim 5 wherein said notch has a depth of 0.65 mm.

7. The method defined in claim 1, further comprising the step of grinding said body flat along said opposite sides with a grinding depth less than a depth of said crevice, finishing said small and large diameter bores, forming said crankshaft eye with holes enabling connection of said cap and said piston rod and transverse to said lines, and then cracking said crankshaft eye along said line to separate said cap from the piston rod.

8. The method defined in claim 7, further comprising the steps of:

assembling the piston rod and the cap along said line by inserting screws into said holes, thereby connecting the piston rod and the cap;

tightening said screws; and machining the piston rod and cap upon tightening of the screws.

* * * * *